Feb. 25, 1969  H. E. STEFFE  3,429,467
AUTO TRANSPORT
Filed March 13, 1967  Sheet 1 of 2
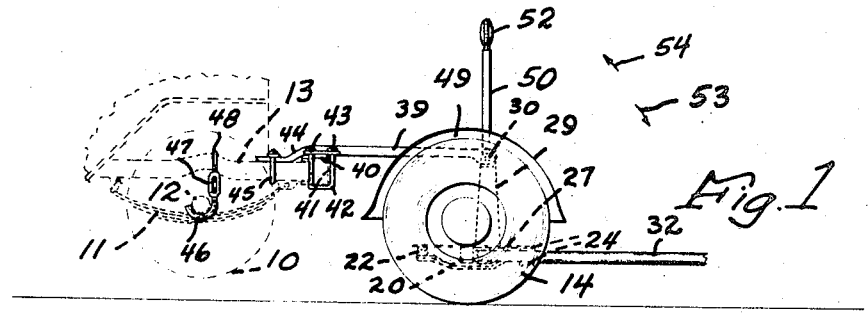
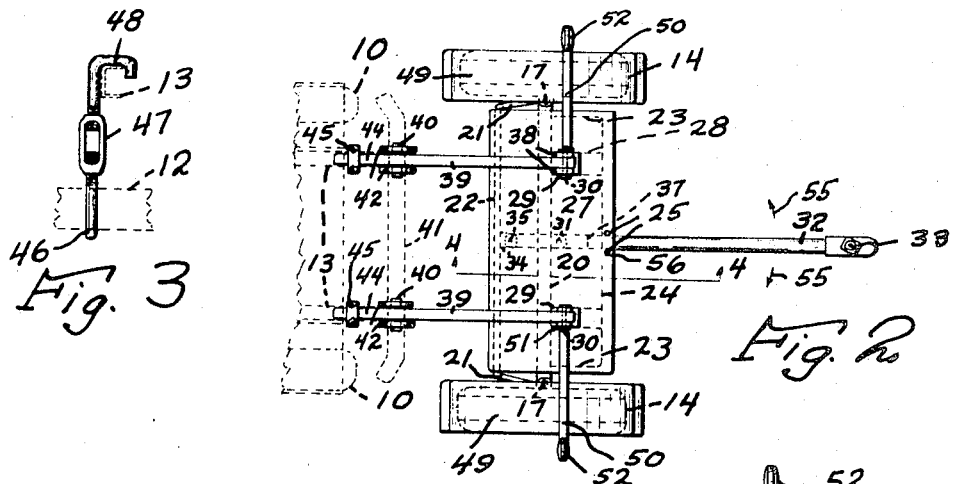
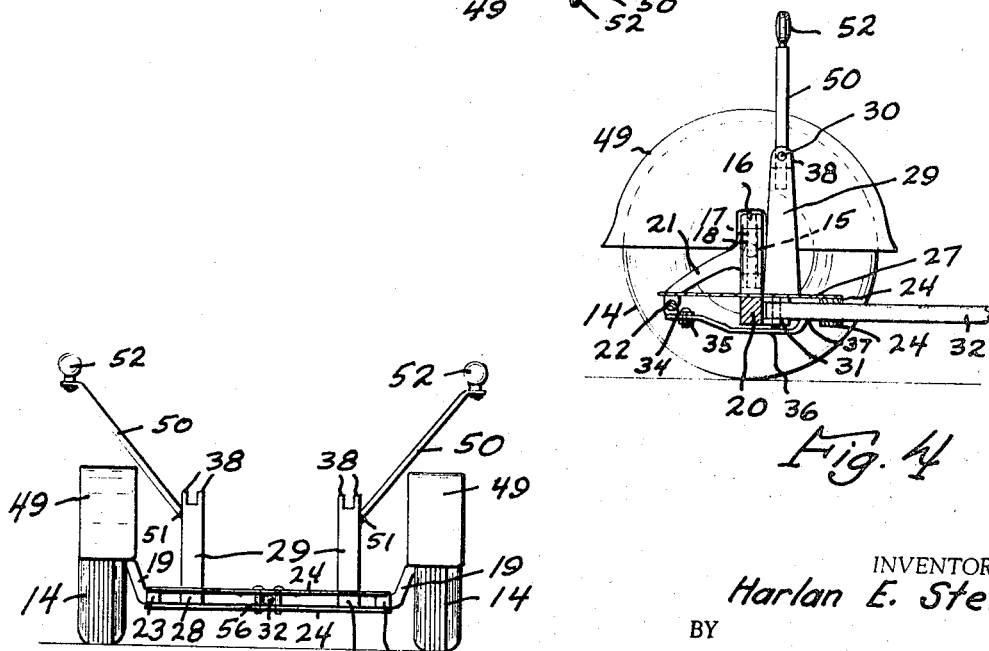
INVENTOR.
Harlan E. Steffe
BY
Sam J. Slotsky
ATTORNEY Feb. 25, 1969  H. E. STEFFE  3,429,467
AUTO TRANSPORT
Filed March 13, 1967
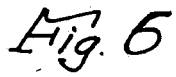
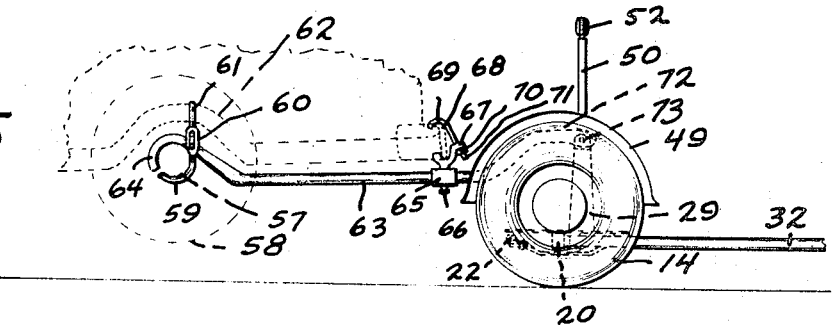
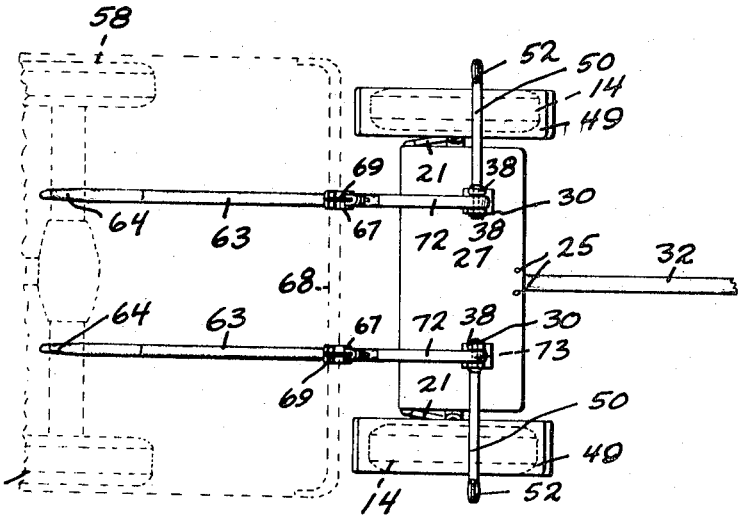
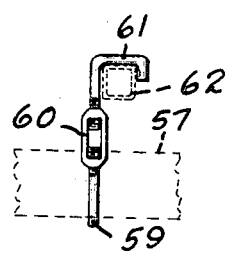
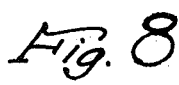
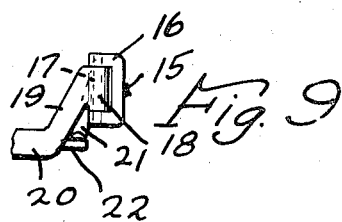
INVENTOR.
Harlan E. Steffe
BY
Sam J. Slotky
ATTORNEY

United States Patent Office 3,429,467
Patented Feb. 25, 1969

3,429,467
AUTO TRANSPORT
Harlan E. Steffe, Boyden, Iowa 51234
Filed Mar. 13, 1967, Ser. No. 622,745
U.S. Cl. 214—384      3 Claims
Int. Cl. B62b *1/02, 7/02*

ABSTRACT OF THE DISCLOSURE

An auto transport attachable to one end of an automobile by which that end can be raised to remove the wheels from the ground, and having steerable wheels for better trailing of the transport.

---

My invention relates to a transport arrangement.

An object of my invention is to provide an arrangement especially useable for Jeeps used for hunting purposes, for instance, or which can be used for the standard automobile.

Certain objects of my invention are to provide a transport which can be readily connected, or disconnected and which will include means for raising and lowering one end of the vehicle to be towed, and which will be safe to use, and which will include lights thereon if and when desired.

A further object of my invention is to provide convenient raising and lowering means which are readily operable.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the Jeep-towing arrangement,

FIGURE 2 is a plan view of FIGURE 1,

FIGURE 3 is a detail,

FIGURE 4 is a sectional detail of FIGURE 2 taken along the line 4—4 thereof,

FIGURE 5 is an end view of FIGURE 1,

FIGURE 6 is a side elevation of the arrangement as used with a standard automobile, FIGURE 7 is a plan view of FIGURE 6, FIGURE 8 is a further detail, and FIGURE 9 is a further detail.

My invention contemplates the provision of an arrangement for towing Jeeps or standard automobiles, the towing of Jeeps being relatively important for hunters since the Jeep is usually used over rough terrain and must be towed to the hunting area, where it must be then quickly disconnected and used.

In describing my invention, I have used the character 10 to indicate the forward wheels of a Jeep which is to be towed by my device, the character 11 indicating the forward springs, the character 12 the axle, and the character 13 the spaced framework portions of the Jeep.

In describing my invention itself, I have used the character 14 to indicate a pair of rubber tired wheels which are journalled on the shafts 15, which shafts 15 (see FIGURE 9) are attached to the members 16 which include the pins 17 which are received within the portions 18 which continue into the portions 19 extending into the bar or axle 20.

Attached to the portions 18 are the arms 21 which are pivotally attached to the tie-rod 22. Attached to the bar 20 are the framework portions 23 which are secured to the vertically spaced straps 24 which include the openings 25 therein.

Attached across the top of the upper strap 24 on the bar 20 is a sheet metal cover 27, and attached between the straps 24 and the bar 20 are the braces 28. Solidly attached to the braces 28, and extending upwardly are the posts 29 having the upper removable pins 30.

Attached to the axle or bar 20 are the ears 31 to which is pivoted the tongue 32 which passes between the straps 24, and includes the attaching means at 33 for providing attachment to the towing vehicle.

Attached to the tie-rod 22 is a bracket 34 to which is pivotally attached at 35, a bar 36 which is welded at 37 to the tongue 32 (see FIGURE 4).

The posts 29 include the upper ears 38 through which are received the pins 30, and pivotally secured to the pins 30 are the substantially horizontally positioned bars 39 which include the transverse straps 40 adapted to bear against the bumper 41 of the Jeep, the U clamps 42 and the nuts 43 serving to rigidly secure the bars 39 to the bumper, the bars 39 further including the extending portions 44 which are clamped by means of the U bolts 45 to the framework portions 13.

For securing the wheels 10 solidly when being transported, I provide the substantially hook shaped members 46 which are received under the axle 12, the turnbuckle member 47 being secured thereto which in turn are engaged with the further hooked shaped members 48 which can be received over the framework portions 13 as shown in FIGURE 1, this device preventing the bouncing spring action when the Jeep is being transported.

FIGURES 1 and 2 show how the Jeep will be transported with the forward wheels being raised. The character 49 indicates fenders which can be provided over the wheels 14, and whenever it is desired the bars 50 can be attached at 51 to the posts 29, and attached at the ends of the bars 50 are the lights 52.

The figures show the Jeep in its raised position, the tongue 32 having been first swung downwardly in the direction of the arrow 53 with the members 39 being secured to the pins 30 which will correspondingly raise the forward wheels for transporting the arrangement.

When it is desired to release the Jeep, the tongue 32 is merely swung in the direction of the arrow 54 which will bring the wheels down to the ground engaging position and the pins 30 are then removed as well as the members 39, 42 etc. together with the members 46, etc.

The unit can be transported alone and during travel of the unit when transporting the Jeep, as the tongue 32 swings in the diretcion of the arrows 55 (see FIGURE 2) the connection of the bar 36 at 37 and at 35 will correspondingly move the tie rod 22 etc., to move the wheels 14 in the same direction.

When the transport is being transported alone, suitable pins 56 (see FIGURE 2) can be inserted in the openings 25 to provide a straight ahead connection.

FIGURES 6 to 8 inclusive illustrate the use of my transport with automobiles of the usual type, and in this case, the character 57 will indicate the rear axle housing of the automobile, and the character 58 the rear wheels, under which axle can be clamped similar structures as that shown in FIGURE 3 including the hook shaped portions 59, the turnbuckles 60 and the upper hook shaped portions 61 received over the framework portions 62, and for this purpose I provide the bars 63 having the curled portions 64 for receiving the axle 57, and I further provide the slideable clamps 65 which can be adjustably positioned along the bars 63, and which can be locked by means of the set screws 66, and attached to the clamps 65 are the members 67 for receiving the bumper portion 68 of the vehicle, the character 69 indicating clamp elements having the nuts 70 engaging the threaded ends 71 of the member 69 for firmly securing the bumper. The bars 63 include the extending portions 72 having openings at 73 for securing the same pins 30 heretofore described, it being noted that the same towing member will thereby operate to tow the usual type of automobile with the rear wheels thereof being raised.

It will now be noted that I have provided the advantages mentioned in the objects of my invention, with further advantages being apparent.

I claim as my invention:

1. An automobile transport comprising a framework, an axle member mounted on said framework, arms pivotally journalled at the ends of said axle member, wheels journalled on said arms, a tongue pivoted to said axle member, a tie rod connected between said tongue and said arms by which said wheels can be turned by movement of said tongue, upwardly extending posts on said framework, support members pivotally attached to the upper ends of said posts, said support members being attachable to an automobile, said framework including vertically spaced transverse bars embracing said tongue whereby movement of said tongue downwardly will cause said automobile to be raised; and means for restraining said tongue in a horizontal position between said bars.

2. The device of claim 1 in which said means for restraining the tongue includes having openings in said bars adjacent said tongue and pins engaged in said openings on opposite sides of said tongue.

3. The device of claim 1 in which said support members include lengthened bars having adjustable clamps secured thereto, said clamps being adapted to be secured to an automobile bumper.

References Cited

UNITED STATES PATENTS

| 2,507,612 | 5/1950 | Rankin | 214—384 |
| 2,699,267 | 1/1955 | Beamer | 214—86 |
| 3,154,204 | 10/1964 | La Venture | 214—86 |

FOREIGN PATENTS 823,245  12/1951  Germany.

ALBERT J. MAKAY, *Primary Examiner.*

U.S. Cl. X.R.

214—86; 254—131; 280—47.15